United States Patent [19]

Yang

[11] 4,041,904
[45] Aug. 16, 1977

[54] PNEUMATIC PULSATOR FOR TEAT CUPS

[75] Inventor: Denis C. Yang, Irvington, N.Y.

[73] Assignee: The De Laval Separator Company, Poughkeepsie, N.Y.

[21] Appl. No.: 686,654

[22] Filed: May 14, 1976

[51] Int. Cl.$^2$ ............................................. A01J 5/10
[52] U.S. Cl. ................................................ 119/14.41
[58] Field of Search ............... 119/14.41, 14.37, 14.07; 137/625.17

[56] References Cited

U.S. PATENT DOCUMENTS

| | | | |
|---|---|---|---|
| 1,400,792 | 12/1921 | Blackmore | 119/14.37 |
| 2,467,512 | 4/1949 | Weiby | 119/14.41 X |
| 3,146,795 | 9/1964 | Retallick | 137/625.17 |
| 3,499,465 | 3/1970 | Roop | 119/14.41 X |

*Primary Examiner*—Hugh R. Chamblee
*Attorney, Agent, or Firm*—Cyrus S. Hapgood

[57] ABSTRACT

A cylindrical chamber in the pulsator housing has upper and lower end portions subjected continuously to atmospheric pressure and to a vacuum, respectively; and the pulsation spaces of the teat cups are connected to corresponding openings in the housing which lead from a region of the chamber located between its said end portions. These end portions are separated from each other by a rotor driven on the cylindrical axis of the chamber and having a peripheral surface engaging the chamber's cylindrical wall substantially continuously around the axis. The rotor has segments spaced from each other and forming parts of said peripheral surface which are located, respectively, above and below said region of the chamber openings, whereby each said pulsation space is subjected alternately to atmospheric pressure for a first time period and to vacuum for a second time period; and the ratio of these time periods can be varied by adjusting the rotor axially in the chamber.

7 Claims, 3 Drawing Figures

PNEUMATIC PULSATOR FOR TEAT CUPS

The present invention relates to milking machines and more particularly to an improved pneumatic pulsator for the teat cups.

There has long been a need for a simplified form of pulsator for milking machines, particularly such a pulsator which is compact and easy to clean. An object of the present invention is to provide a pulsator which fulfills this need.

There has also been a long-felt need for a simplified pulsator which can be easily adjusted to vary the ratio of the time periods during which the pulsation spaces in the teat cups are subjected to low pressure and to high pressure, respectively, in each pulsation cycle. A further object of the invention is to provide a pulsator which fulfills this need.

According to the invention, a cylindrical chamber in the pulsator housing has upper and lower end portions maintained, respectively, at high pressure and at low pressure; and the pulsation spaces of the teat cups are connected to corresponding openings leading from an intermediate region of said chamber located between its end portions, these openings being spaced from each other around the cylindrical axis of the chamber. Mounted in the chamber for rotation on its cylindrical axis is a rotor having a peripheral surface engaging the cylindrical chamber wall substantially continuously around the axis, the rotor having spaced segments forming spaced parts of said peripheral surface which are located, respectively, above and below said region of the chamber openings. Thus, as the rotor is rotated by a driving means, the pulsation space of each teat cup is subjected alternately to a high pressure for a first time period and to a low pressure for a second time period.

If desired, the number of openings in this intermediate region of the cylindrical chamber may be only two, preferably spaced 180° from each other, in which case each opening serves two of the four teat cups. Preferably, however, there are four such openings equally spaced around the cylinder axis and each serving only one teat cup, whereby all four teats are pulsed in sequence.

In the preferred construction, means are provided for adjusting the rotor axially in the cylindrical chamber, thereby changing the extent to which the above-mentioned first and second parts of the rotor's peripheral surface are displaced above and below the region of the chamber openings. In this way, the ratio of the aforementioned time periods can be easily varied.

The rotor may have various configurations to provide it with said spaced peripheral parts located above and below the region of the chamber openings. For example, the rotor's peripheral surface may be in the form of an ellipse extending around the rotor axis, these spaced peripheral parts being at opposite ends of the major axis of the ellipse. Alternatively, the rotor may have a stepped configuration to provide these spaced peripheral parts.

For a better understanding of the invention, reference may be had to the accompanying drawings, in which.

Figure 1:
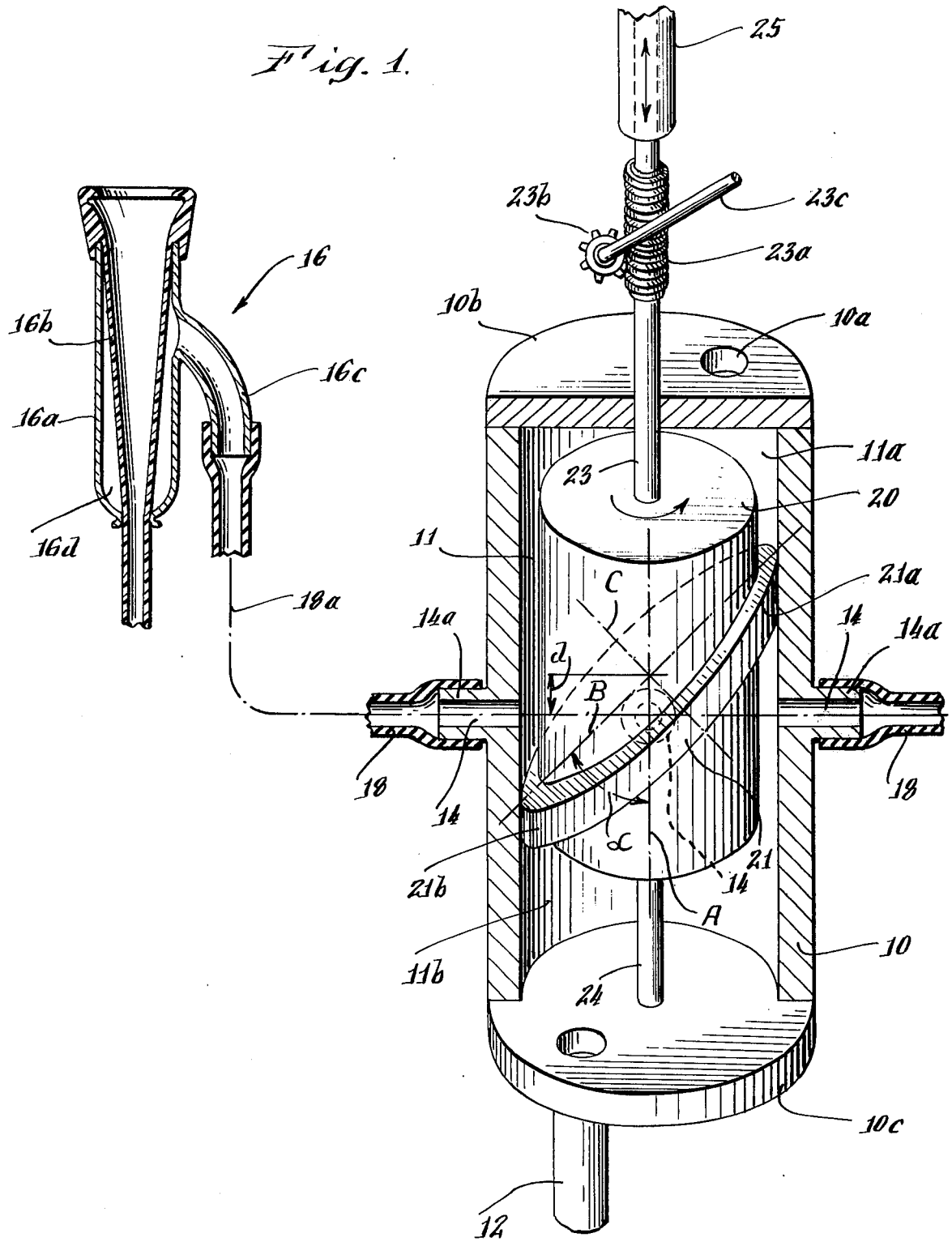
FIG. 1 is a perspective view, partly in section, of one example of the new pulsator, showing schematically its connection to one of the teat cups.

Referring to FIG. 1, pulsator housing 10 forms a cylindrical chamber 11 having an upper end portion 11a communicating with atmosphere through a vent opening 10a in cover plate 10b of the housing. The lower end portion 11b of the chamber communicates with a vacuum duct 12 which opens through the housing's bottom plate 10c.

Housing 10 has a plurality of openings 14 leading from an intermediate region of chamber 11 located between its opposite end portions 11a and 11b. In the FIG. 1 embodiment of the invention, there are four of these openings 14, one for each of the four teat cups, and the openings are equally spaced around the cylindrical axis A of the chamber (the fourth opening does not appear in the sectional view). Each opening 14 extends through an exterior boss 14a of the housing and is connected to a corresponding teat cup, of which only one is shown at 16. The teat cup, as illustrated, is of the conventional type comprising a metal shell 16a and a rubber-like liner 16b which receives the teat. The shell 16a has a nipple 16c leading to the pulsation space 16d surrounding the liner.

Each chamber opening 14 may be connected directly to the corresponding pulsation space 16d, as through a flexible tube 18 leading to the nipple 16c. Alternatively, the connection may be effected indirectly in a conventional manner by way of the usual milk claw (not shown), as indicated schematically at 18a.

Chamber 11 contains a rotor 20 mounted for rotation about the cylindrical axis A. The rotor has a peripheral surface 21 which makes a close sliding contact with the cylindrical wall of the chamber continuously around the axis A. Diametrically opposed segments of rotor 20 form two spaced parts 21a and 21b of the peripheral surface 21, and these surface parts are located above and below, respectively, the chamber's intermediate region from which the openings 14 lead. As shown, the peripheral surface 21 is in the form of an ellipse extending around axis A, the surface parts 21a and 21b being at opposite ends of the major axis B of the ellipse.

Rotor 20 has upper and lower shafts 23 and 24 slidable vertically in bearings (not shown) in the housing end plates 10b and 10c, respectively. Upper shaft 23 projects through plate 10b and is slidable vertically in a driving member 25 to which this shaft is splined for driving the rotor. Between driving member 24 and housing 10, the upper shaft 23 has a rack 23a which is modified in that its teeth extend completely around the shaft. A pinion 23b engages rack 23a and is mounted on a supporting arm 23c which may be raised or lowered by any suitable means (not shown). Thus, rotor 20 may be driven from the driving means 25 in different axial positions as determined by the position of supporting rod 23c. Of course, the parts 23a-23c may be replaced by any other conventional means for adjusting the rotor axially in chamber 11.

In the operation of the FIG. 1 embodiment, rotor 20 is driven (counter-clockwise, for example) by member 25 at a constant speed which can be adjusted to determine the frequency of the pulsations. In the illustrated position of the rotor, the right-hand opening 14 is blocked from atmosphere while connected to vacuum, and the diametrically opposed left-hand opening 14 is blocked from vacuum while connected to atmosphere. Also, the major axis B of the ellipse is in the same vertical plane as the center line of the left-hand and right-hand openings 14, so that these openings will be in the middle of their atmospheric pressure and vacuum periods, respectively. When the rotor has turned 180° from this initial position, the reverse is true in that the left-hand and right-hand openings 14 are now in the middle of their vacuum and atmospheric pressure periods, respectively. The same is true with respect to the diametrically opposed openings 14 of the other pair, assuming that the initial position of the rotor is 90° from its position shown in FIG. 1.

Thus, the pulsation space 16d of each teat cup is exposed alternately to atmospheric pressure and to vacuum as the rotor 20 is driven, the four teat cups being subjected in sequence to the full vacuum.

The pulsation ratio of this operation is ta/tv, where ta is the time period during which each opening 14 is exposed to atmosphere in a complete revolution of rotor 20, and tv is the time period during which the opening is exposed to vacuum in the complete revolution. With the rotor positioned axially so that the minor axis C of ellipse 21 is in the same plane (i.e., at the same level) as the four openings 14, this pulsation ratio is 1 to 1. To increase this ratio, the rotor is adjusted axially downward, thereby reducing tv and increasing ta. The reverse is true, of course, when the rotor is adjusted upward.

The pulsation ratio may be expressed mathematically as follows:

$$ta/tv = \frac{180}{\cos - 1\,(d/r \cot a)} - 1$$

where $r$ is the radius of chamber 11, $d$ is the distance between the center of ellipse 21 and the center line of the openings 14 (as shown in FIG. 1) and $\alpha$ is the angle between major axis B of the ellipse and the rotation axis A (as shown in FIG. 1).

Figure 3:
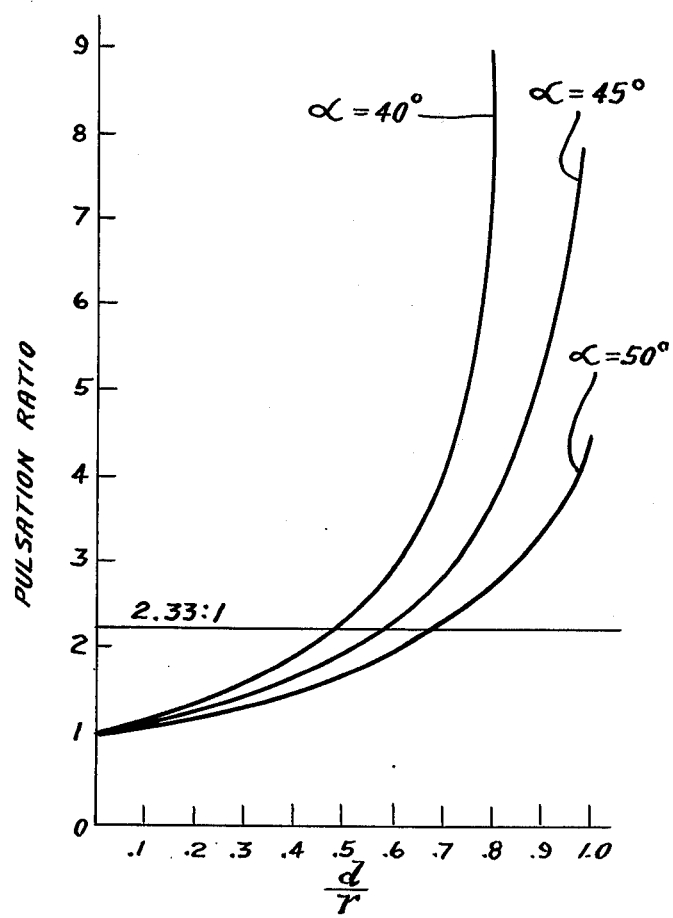
FIG. 3 is a graph showing the different pulsation ratios obtained with different axial positioning of the rotor in the example illustrated in FIG. 1.

This relationship is expressed in the graph of FIG. 3, where the three curves show the relationship for different values of the angle $\alpha$.

Figure 2:
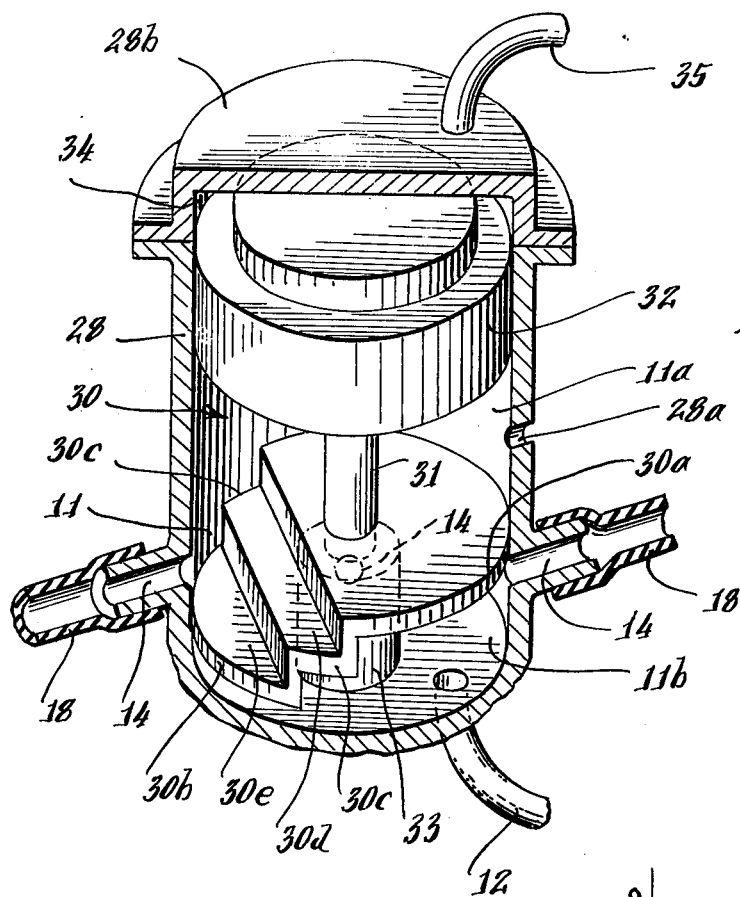
FIG. 2 is a similar view of another example of the new pulsator.

Turning now to FIG. 2, the pulsator housing 28 has four openings 14 equally spaced around the axis of cylindrical chamber 11 and connected through tubes 18 to corresponding teat cups, as in FIG. 1. The lower end portion 11b of the housing chamber is subjected to suction from a vacuum duct 12, and the upper end portion 11a is subjected to atmospheric pressure from a vent 28a, these opposite end portions being separated by a rotor 30. As in FIG. 2, the rotor's periphery makes a close sliding contact with the cylindrical wall of chamber 11 continuously around the rotor axis, and this periphery includes two spaced parts 30a and 30b located above and below, respectively, the chamber's intermediate region from which the openings 14 lead. However, these peripheral parts of the rotor, unlike the corresponding parts in FIG. 1, are interconnected by opposing stepped portions 30c of the rotor's periphery.

As shown in FIG. 2, rotor 30 is mounted on a vertical shaft 31, the lower end of which is slidable in a bearing housing 33 on the bottom of chamber 11. Above the rotor, shaft 31 is connected to a driving motor assembly 32 which fits snugly in chamber 11 and is movable vertically therein in the manner of a piston. A cover plate 28b at the upper end of housing 28 forms with motor assembly 32 a closed space 34 which can be subjected alternately to vacuum and at least atmospheric pressure through a pneumatic tube 35.

When space 34 is at atmospheric pressure, this pressure and the weight of the parts 30-32 will cause the lower end of shaft 31 to bottom in the bearing housing 33. The upper step 30d of rotor 30 will then be at the level of the lower edges of openings 14. Thus, each opening 14 will be exposed to vacuum for a relatively short time period dependent upon the circumferential extent of the rotor's peripheral part 30a. However, when space 34 is subjected to vacuum, the parts 30-32 rise to their uppermost positions with the assistance of a return spring (not shown) in the bearing housing 33. The rotor's lower step 30c will then be at the level of the lower edges of openings 14, whereby each opening will be exposed to vacuum for a longer time period dependent upon the circumferential extent of the rotor's peripheral parts 30a and 30c. Of course, the atmospheric pressure-time period will be correspondingly reduced when the vacuum time period is increased.

It will be apparent that the FIG. 2 embodiment operates generally in the same manner as the FIG. 1 embodiment, except that only two different pulsation ratios are possible in FIG. 2. However, other such ratios can be provided in FIG. 2, if necessary, by replacing rotor 30 with one having a different dimensioning of the steps.

In addition to its simplicity and compactness, the new pulsator can be easily cleaned by removing the cover plate 10b or 28b and then removing the rotor.

It will be understood that the mentions herein of the "upper" and "lower" ends of the pulsator housing are merely to provide convenient reference points for describing and claiming the new structure and are not to be taken as limiting. Obviously, the pulsator housing could be in a horizontal rather than a vertical position and also could be inverted from its illustrated position.

I claim:

1. In combination with a plurality of teat cups, a pneumatic pulsator comprising a housing forming a cylindrical chamber having a central axis, said chamber having upper and lower end portions maintained, respectively, at a high pressure and at a low pressure, the housing having a plurality of openings leading from a region of the chamber located between its said end portions, said openings being spaced from each other around said axis, said teat cups each having a pulsation space connected to a corresponding one of said openings, a rotor mounted in the housing chamber for rotation on said axis and having a peripheral surface engaging the cylindrical wall of the chamber substantially continuously around said axis, the rotor having first and second segments spaced from each other and forming first and second parts of said peripheral surface which are located, respectively, only above and only below said region of the chamber openings, means for driving the rotor on said axis to subject each said pulsation space alternately to said high pressure for a first time period and to said low pressure for a second time period, and means for adjusting the rotor axially in said chamber to vary the ratio of said time periods.

2. The combination of claim 1, in which said openings are four in number, one for each of said teat cups, whereby the four teat cups are pulsed in sequence as the rotor is driven.

3. The combination of claim 1, in which said peripheral surface is in the form of an ellipse extending around said axis, said first and second segments being opposite each other on the major axis of the ellipse.

4. The combination of claim 1, in which the rotor has a stepped portion interconnecting said first and second segments, each said peripheral surface part curving in a plane substantially normal to said axis and being connected to the other surface part by parts of said surface formed by said stepped portion.

5. The combination of claim 1, in which said rotor driving means include a drive shaft connected to the rotor and having a toothed rack, said rotor adjusting means including a rotatable pinion meshing with the rack.

6. In combination with a plurality of teat cups, a pneumatic pulsator comprising a housing forming a cylindrical chamber having a central axis, said chamber having upper and lower end portions maintained, respectively, at a high pressure and at a low pressure, the housing having a plurality of openings leading from a region of the chamber located between its said end portions, said openings being spaced from each other around said axis, said teat cups each having a pulsation space connected to a corresponding one of said openings, a rotor mounted in the housing chamber for rotation on said axis and having a peripheral surface engaging the cylindrical wall of the chamber substantially continuously around said axis, the rotor having first and second segments spaced from each other and forming first and second parts of said peripheral surface which are located, respectively, above and below said region of the chamber openings, means for driving the rotor on said axis to subject each said pulsation space alternately to said high pressure for a first time period and to said low pressure for a second time period, and means for adjusting the rotor axially in said chamber to vary the ratio of said time periods, said rotor driving means including a motor assembly slidably mounted in the upper end portion of the housing and forming therewith a closed space at the top of the housing, the motor being connected to the rotor through a part of said upper portion which is vented to atmosphere, said rotor adjusting means including a source of variable pressure communicating with said closed top space.

7. The combination of claim 6, in which the rotor has stepped portion interconnecting said first and second segments, each said peripheral surface part curving in a plane substantially normal to said axis and being connected to the other surface part by parts of said surface formed by said stepped portion.

* * * * *